United States Patent
Saito

(10) Patent No.: US 10,289,754 B2
(45) Date of Patent: May 14, 2019

(54) SETTING METHOD OF METAL SHEET ANISOTROPY INFORMATION AND SHEET THICKNESS INFORMATION FOR ANALYSIS MODEL OF PRESS-FORMED PANEL, AND STIFFNESS ANALYZING METHOD

(71) Applicant: JFE Steel Corporation, Tokyo (JP)

(72) Inventor: Takanobu Saito, Tokyo (JP)

(73) Assignee: JFE Steel Corporation (JP)

( * ) Notice: Subject to any disclaimer, the term of this patent is extended or adjusted under 35 U.S.C. 154(b) by 1011 days.

(21) Appl. No.: 14/413,541

(22) PCT Filed: Jul. 8, 2013

(86) PCT No.: PCT/JP2013/004208
§ 371 (c)(1),
(2) Date: Jan. 8, 2015

(87) PCT Pub. No.: WO2014/017037
PCT Pub. Date: Jan. 30, 2014

(65) Prior Publication Data
US 2015/0186554 A1    Jul. 2, 2015

(30) Foreign Application Priority Data
Jul. 24, 2012  (JP) ................................ 2012-163522

(51) Int. Cl.
*G06F 17/50*    (2006.01)

(52) U.S. Cl.
CPC .......... *G06F 17/50* (2013.01); *G06F 17/5018* (2013.01); *G06F 17/5095* (2013.01); *G06F 2217/41* (2013.01); *G06F 2217/42* (2013.01)

(58) Field of Classification Search
None
See application file for complete search history.

(56) References Cited

U.S. PATENT DOCUMENTS

2011/0218778 A1    9/2011    Klimmek

FOREIGN PATENT DOCUMENTS

| DE | 10 2007 039 337 | 12/2008 |
|----|-----------------|---------|
| JP | 2004-171144 A   | 6/2004  |

(Continued)

OTHER PUBLICATIONS

Richard Sturt et al., "Residual effects of metal forming: their effect on crash results," 2001, Proceedings of 17th International Technical Conference on the Enhanced Safety of Vehicles, SAE paper 2001-06-0148, pp. 1-6.*

(Continued)

*Primary Examiner* — Kamini S Shah
*Assistant Examiner* — Russ Guill
(74) *Attorney, Agent, or Firm* — DLA Piper LLP (US)

(57) ABSTRACT

A method of setting metal sheet anisotropy information and sheet thickness information for an analysis model of a press-formed panel includes spreading the analysis model of the press-formed panel into a blank shape by analysis of reverse press-forming; acquiring sheet thickness information obtained by the analysis of reverse press-forming; based on a spread-blank-shape and a panel-taking blank shape, acquiring a reference direction of the spread-blank-shape; calculating an angle formed between the reference direction of the spread-blank-shape and each element in the spread-blank-shape, and setting the reference direction for each element of the analysis model of the press-formed panel based on the calculated angle; and setting the sheet thickness information acquired in the sheet-thickness-information acquiring step for each element of the analysis model of the press-formed panel.

7 Claims, 6 Drawing Sheets

(56) References Cited

FOREIGN PATENT DOCUMENTS

| | | |
|---|---|---|
| JP | 2009-277143 A | 11/2009 |
| JP | 2010-061249 A | 3/2010 |
| JP | 2012-056392 A | 3/2012 |

OTHER PUBLICATIONS

Erwan Mestres, "Coupling simulations: A simple way to increase results accuracy," Jan. 25, 2012, http://insider.altairhyperworks.com/coupling-simulations/, X-Com Systems, five pages.*

Dong-Zhi Sun et al., "Simulation of the process chain from forming to crash taking into account stochastic aspects," 2010, DYNAmore GmbH, 10 pages.*

Andre Oeckerath et al., "Improved product design using mapping in manufacturing process chains," 2010, DYNAmore GmbH, 10 pages.*

Supplementary European Search Report dated May 20, 2016, of corresponding European Application No. 13822394.6.

Lee, C.H., et al., "Three dimensional multi-step inverse analysis for the optimum blank design in sheet metal forming processes," *Journal of Materials Processing Technology*, vol. 80-81, Aug. 1, 1998, pp. 76-82.

Azizi, R., "Different implementations of inverse finite element method in sheet metal forming," *Materials and Design*, vol. 30, No. 8, Sep. 1, 2009, pp. 2975-2980.

Brunet, M., et al., "Failure analysis of anisotropic sheet-metals using a non-local plastic damage model," *Journal of Materials Processing Technology*, vol. 170, No. 1-2, Dec. 14, 2005, pp. 457-470.

\* cited by examiner

SETTING METHOD OF METAL SHEET ANISOTROPY INFORMATION AND SHEET THICKNESS INFORMATION FOR ANALYSIS MODEL OF PRESS-FORMED PANEL, AND STIFFNESS ANALYZING METHOD

TECHNICAL FIELD

This disclosure relates to a CAE (computer aided engineering) analyzing method for a press-formed panel using a metal sheet having anisotropy, and more particularly relates to a setting method of anisotropy information and sheet thickness information for an analysis model of a press-formed panel, and stiffness analyzing method based on the setting method.

BACKGROUND

In recent years, automobile weight reduction is promoted due to an environmental issue particularly in the automobile industry. CAE analysis is an essential technology for the design of the automotive body (for example, see Japanese Unexamined Patent Application Publication No. 2004-171144). Also, it is known that the result of the CAE analysis is largely affected by mechanical characteristic values of a material to be input (metal sheet, for example, steel sheet). In press-forming analysis, YS (yield strength), TS (tensile strength), and r value (Lankford value) mainly contribute to the analysis. In stiffness analysis, an elasticity coefficient such as a Young's modulus contributes to the analysis in proportion to a displacement obtained by the analysis. In crashworthiness analysis, metal sheet strength values such as YS and TS largely contribute to the analysis.

Meanwhile, there may be a metal sheet, the mechanical characteristic of which has large in-plane anisotropy (the metal sheet is called anisotropic metal sheet). In particular, it is known that a metal sheet manufactured by rolling has a variation in characteristic from 2% to 50% in view of a characteristic variation range calculated by (maximum−minimum)/maximum×100, in the rolling direction (L direction), the direction orthogonal thereto (C direction), and the 45° direction (D direction).

In the CAE analysis, if the analysis subject is a metal sheet, the mechanical characteristic of which is constant in a planar direction (isotropic metal sheet), a problem caused by a direction does not occur. However, in an anisotropic metal sheet, if a mechanical characteristic value in a direction different from a major deformed direction of the metal sheet is input, the calculation result may be different from the calculation result without anisotropy.

Hence, for the anisotropic metal sheet, information relating to the in-plane anisotropy of the mechanical characteristic (hereinafter referred to as anisotropy information) is required to be set for each element of the analysis model, which is formed by dividing the analysis subject into a plurality of elements.

The anisotropy information provides a mechanical characteristic value corresponding to a desirable direction. The anisotropy information is provided while a certain direction (for example, the L direction, the C direction, or a direction between these directions) serves as a reference direction, as correspondence information between an azimuth angle with respect to the reference direction and the mechanical characteristic. The anisotropy information can be previously provided in the form of a table or a function. The table or the function may be stored and used through an analysis program.

The relationship between the reference direction and the azimuth angle is described more specifically by using the above-described rolled metal sheet as an example. If it is assumed that the C direction is the reference direction (azimuth angle 0°), the mechanical characteristic at the azimuth angle of 90° is the mechanical characteristic in the L direction, and the mechanical characteristic at the azimuth angle of 45° is the mechanical characteristic in the D direction. Also, if it is assumed that the L direction is the reference direction, the mechanical characteristic at the azimuth angle of 90° with respect to the reference direction is the mechanical characteristic in the C direction orthogonal to the L direction with reference to the table.

The reference direction is indicated by a single arrow in each element on the analysis image (for example, see FIG. 4). The reference direction is fixed to each element of the analysis model. If each element moves and rotates, the reference direction moves and rotates similarly.

As described above, if the aforementioned anisotropic metal sheet is used for an automotive body in the automobile industry, the anisotropy information is required to be set for the analysis model in the CAE analysis.

However, when the automotive body is designed, in many cases, at first, the shape of the automotive body is determined, the analysis model is created for the shape, and then the stiffness analysis is executed.

The analysis model based on the shape is not provided with the anisotropy information. Hence, correct analysis cannot be executed even if the stiffness analysis is executed in this state. Therefore, in the past, the anisotropy information has been input according to guesswork for each element of the analysis model to set the anisotropy information for the analysis model in preparation for the analysis.

However, the number of elements used for the analysis model of the current automotive body is about 300,000 to 500,000. It is extremely difficult to manually input the anisotropy information for all elements.

Also, an actual press-formed panel has a complex shape with curves. The movement and rotation of each element by press-forming cannot be correctly recognized according to such guesswork, and it is difficult to properly input the anisotropy information.

Thus, even if the anisotropy information is input according to the guesswork of the person, the result of the stiffness analysis obtained thereafter may frequently mismatch the result of the stiffness test or crashworthiness test of the corresponding actual press-formed panel.

Also, the analysis model in which only the above-described shape is modeled does not have set therein the variation information of the sheet thickness by press-forming, that is, the sheet thickness information.

However, the sheet thickness information is very important to execute the CAE analysis more correctly. For example, since a structure body using a sheet, represented by the automotive body, is press-formed, the sheet thickness may be different from the original sheet thickness depending on the position of the panel. For example, the thicknesses of an R portion and a bulging portion are decreased, and the thickness of a wrinkled portion is increased.

If the sheet thickness is both decreased and increased as described above, the stiffness and crashworthiness characteristic of the portions are decreased and increased. Hence, to execute the correct CAE analysis, analysis has been requested to be executed with regard to the sheet thickness information.

It could therefore be helpful to provide a setting method of anisotropy information and sheet thickness information correctly with a markedly reduced calculation time without manual input.

SUMMARY

I thus provide:

(1) A method of setting metal sheet anisotropy information and sheet thickness information for an analysis model of a press-formed panel is a method of setting metal sheet anisotropy information and sheet thickness information for an analysis model of a press-formed panel by using a computer. The method includes a spread-blank-shape acquiring step of spreading the analysis model of the press-formed panel into a blank shape by analysis of reverse press-forming; a sheet-thickness-information acquiring step of acquiring sheet thickness information obtained by the analysis of reverse press-forming; a reference-direction acquiring step of, based on a spread-blank-shape acquired in the spread-blank-shape acquiring step and a panel-taking blank shape when a panel is taken from a steel sheet having a predetermined reference direction relating to in-plane anisotropy of a mechanical characteristic of the metal sheet, acquiring the reference direction of the spread-blank-shape; a reference-direction setting step of calculating an angle formed between the reference direction of the spread-blank-shape acquired in the reference-direction acquiring step and each element in the spread-blank-shape, and setting the reference direction for each element of the analysis model of the press-formed panel based on the calculated angle; and a sheet-thickness-information setting step of setting the sheet thickness information acquired in the sheet-thickness-information acquiring step for each element of the analysis model of the press-formed panel.

(2) In the configuration described in aforementioned (1), the mechanical characteristic is at least one selected from a Young's modulus, a yield strength, a tensile strength, an r value, and a stress-strain curve.

(3) A stiffness analyzing method of executing stiffness analysis while the analysis model of the press-formed panel after the reference-direction setting step and the sheet-thickness-information setting step described in aforementioned (1) or (2) serves as an analysis subject.

(4) A crashworthiness analyzing method of executing crashworthiness analysis while the analysis model of the press-formed panel after the reference-direction setting step and the sheet-thickness-information setting step described in aforementioned (1) or (2) serves as an analysis subject.

Since the analysis is entirely executed by a computer, the reference direction relating to in-plane anisotropy of the mechanical characteristic set for each element in the analysis subject is correctly reflective of the actual state, and the reference direction can be automatically input. Accordingly, the creation time is markedly reduced. Also, if the stiffness analysis or crashworthiness analysis is executed on a press-formed panel having a calculated shape, the calculation value matches the experimental value well, and the accuracy of deformation simulation can be increased.

Figure 1:
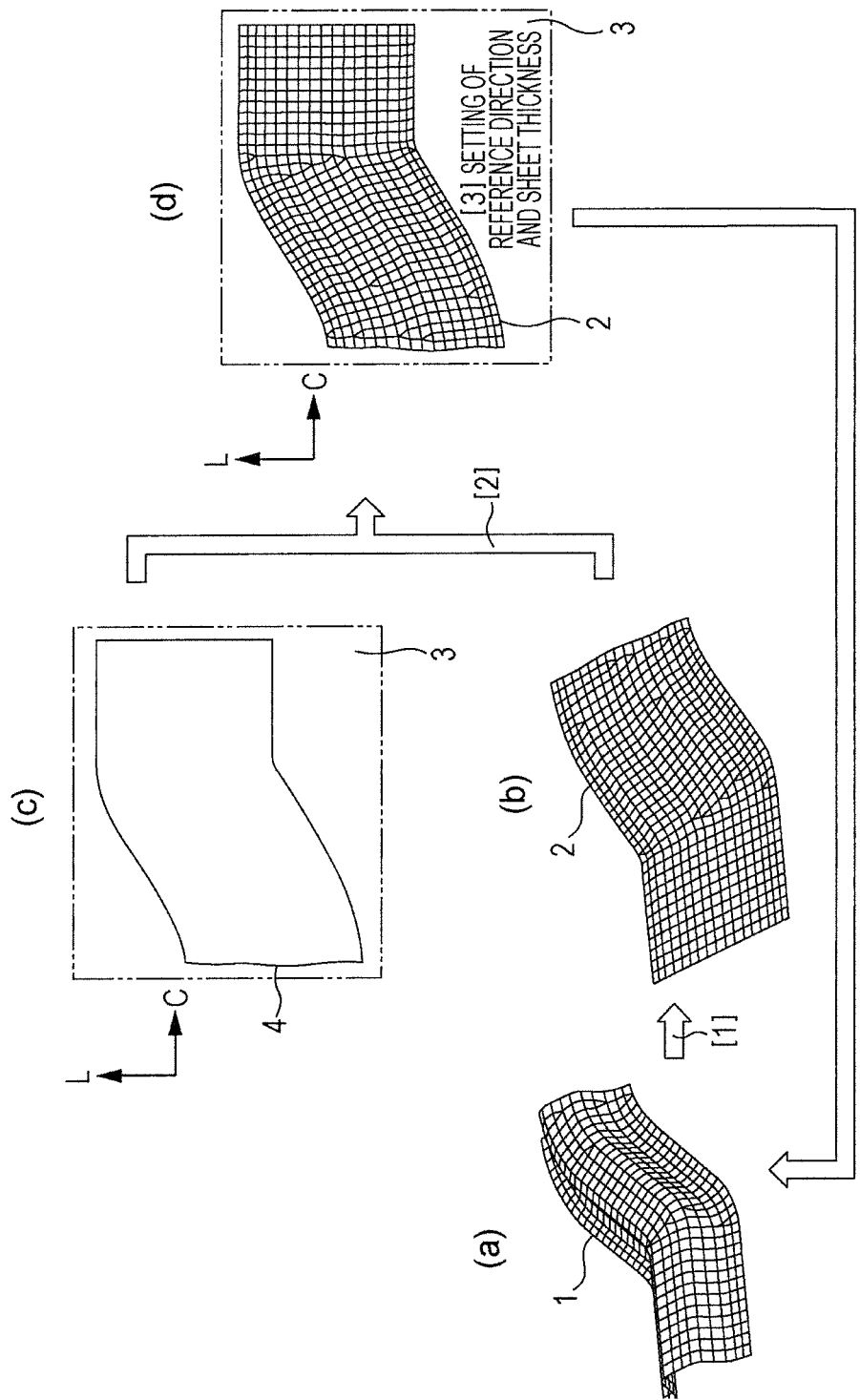
FIGS. 1(a)-(d) provide explanatory views each showing an example of my method.

REFERENCE SIGNS LIST 1 analysis model (before setting of anisotropy information and sheet thickness information)
2 blank
3 metal sheet (metal sheet from which blank is taken)
4 panel-taking blank shape
5 analysis model (after setting of anisotropy information and sheet thickness information)

DETAILED DESCRIPTION

A press-formed panel is typically obtained by taking a blank from an anisotropic metal sheet such as a rolled metal sheet and obtained by press-forming the blank. Hence, data on blanking (panel-taking blank shape) is additionally available. In the blanking data, the relative positional relationship between the anisotropic metal sheet and the blank member is obtained. Hence, the reference direction of the anisotropy information for the blank member can be acquired as long as the reference direction of the anisotropic metal sheet can be acquired.

Meanwhile, if analysis of reverse press-forming is executed for the analysis model of the press-formed panel, a spread-blank-shape obtained by spreading the analysis model into the blank shape is expected to be the same shape as the panel-taking blank shape. Accordingly, by comparing both shapes to each other, the reference direction in the spread-blank-shape can be acquired.

Then, I provide a method of setting the reference direction for the analysis model of the press-formed panel when the reference direction in the spread-blank-shape is acquired.

Since each element in the analysis model of the press-formed panel is very small, even if the analysis model of the press-formed panel is spread into the blank shape by the analysis of reverse press-forming, the deformation thereof is very small. Also, even if deformation occurs, the deformation is from a square into a rectangle or a parallelogram.

Hence, if each element is not deformed or if each element is deformed into a rectangle, the relative positional relationship between a side of each element and a certain direction in the element, for example, the reference direction, is not changed before and after the analysis of reverse press-forming.

Also, even if the element is deformed into a parallelogram, by taking into account a displacement of an orthogonal side of the element, the relative relationship between the side of the element and the certain direction in the element can be obtained before and after the analysis of reverse press-forming.

The analysis model has coordinate information of nodes before and after the deformation of each element, that is, before and after the analysis of press-forming or analysis of reverse press-forming, the side of the element can be obtained by using a line joining the nodes of the element.

Hence, by acquiring an angle formed by the line joining the nodes of each element in the spread-blank-shape and the reference direction in the anisotropy information, the relative positional relationship between the side and the reference direction of the element in the spread-blank-shape can be obtained, and the reference direction can be easily set for the analysis model of the press-formed panel based on the angle.

Also, by executing the analysis of reverse press-forming in which the press-formed panel is spread into the blank shape, the sheet thickness information of each element can be acquired.

Hereinafter, analysis is entirely executed by a computer. FIG. 1 provides explanatory views each showing an example of my method. Reference sign 1 denotes an analysis model of a press-formed panel. Anisotropy information or sheet thickness information is not set for the analysis model 1.

The metal sheet of the analysis model 1 is an anisotropic metal sheet (in this example, cold-rolled steel sheet). Anisotropy information of this metal sheet is correspondence information between an azimuth angle with respect to the reference direction and a mechanical characteristic. In this case, the anisotropy information is stored in the form of a table.

Figure 8:
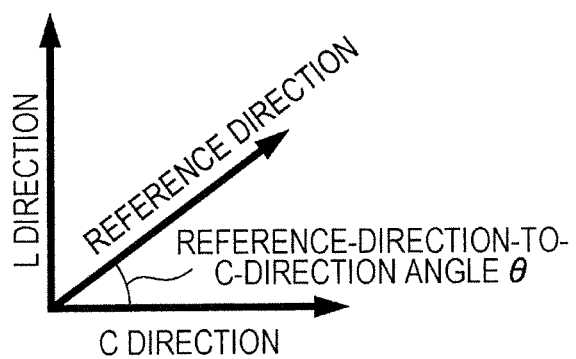
FIG. 8 is an illustration explaining anisotropy information.

The reference direction is a direction rotated counterclockwise from the C direction by an angle θ (this angle θ is also referred to as reference-direction-to-C-direction angle) (see FIG. 8). The table holds mechanical characteristic values corresponding to three angles of θ=0°, θ=45°, and θ=90°. By designating θ in the table, the reference direction can be set or changed. If θ=0° is designated, the C direction serves as the reference direction. If θ=45° is designated, a direction rotated counterclockwise from the C direction by 45° serves as the reference direction. If θ=90° is designated, a direction rotated counterclockwise from the C direction by 90° (=L direction) serves as the reference direction. The mechanical characteristic values in the table are respective pieces of data of Young's modulus, yield strength, tensile strength, r value, and stress-strain curve. Depending on the type of analysis to be executed (the above-described stiffness analysis or crashworthiness analysis), data required for the analysis is selected from these pieces of data, and is used.

In the following description, an example of reference-direction-to-C-direction angle θ=0°, that is, an example, in which the C direction serves as the reference direction, is described.

In CAE analysis, the analysis model 1 is divided into a plurality of regions in a mesh form as shown in FIG. 1(a). Each of the plurality of divided regions is an element.

In a first step [1] ((A), (B) spread-blank-shape acquiring step, and (B) sheet-thickness-information acquiring step, described below), the analysis of reverse press-forming is executed for the analysis 1 so that the analysis model 1 is spread into a blank having a planar shape (spread-blank-shape 2) (see FIG. 1(b)), and sheet thickness distribution information for the analysis model 1 is acquired.

The analysis of reverse press-forming is analysis that press-forming a subject product shape in a reverse manner and, hence, restores the product shape into a flat sheet. To be specific, a finite element model is created for the subject product shape, and the finite element model is spread into a plane so that the strain energy is minimized (i.e., so that elements do not overlap each other and the deformation of each element is minimized).

Further, deformation of each element and the state of the sheet thickness and the like of the spread planar finite element model are reflected on a corresponding element of the finite element model with the product shape before the spread. Accordingly, the sheet thickness distribution state and the like of the product shape before the spread can be obtained.

In a second step [2] ((C) reference-direction acquiring step, described below), the spread-blank-shape 2 is moved and rotated and the direction of the spread-blank-shape 2 is aligned with the direction of a panel-taking blank shape 4. Accordingly, relative positional relationship with respect to a steel sheet 3 of the spread-blank-shape 2 can be acquired. Data of the panel-taking blank shape 4 is previously input (see FIG. 1(c)).

To align the spread-blank-shape 2 in FIG. 1(b) with the panel-taking blank shape 4 in FIG. 1(c), the spread-blank-shape 2 in FIG. 1(b) is rotated by 180°. Accordingly, the reference direction can be set at each element of the spread-blank-shape 2, based on the reference direction of the steel sheet 3. As described above, the reference-direction-to-C-direction angle θ is set at 0° in this example and, hence, the C direction serves as the reference direction. The C direction is already set as the reference direction at the steel sheet 3.

Figure 7:
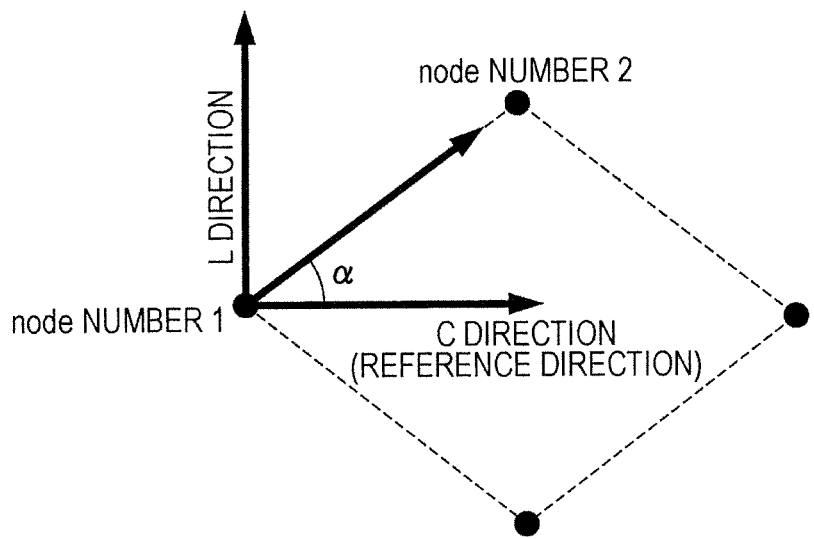
FIG. 7 is an explanatory view explaining a precondition.

In a third step [3] ((D), (E) reference-direction setting step, and (F) sheet-thickness-information setting step, described below), as shown in FIG. 7, an angle α formed between a line joining a node number 1 to a node number 2 and the reference direction, is calculated by an outer product, with reference to X coordinates and Y coordinates of the node number 1 and the node number 2 acquired in (A) ((D) described below).

Regarding a certain element, if the shape of the element is not changed, or if the shape of the element is changed from a square to a rectangle, the angle α in the state of the spread-blank-shape 2 is not changed from the angle α in the state of the analysis model 1. Hence, based on the angle α, the reference direction can be set for the analysis model 1, by calculation in a reverse manner from the line joining the node number 1 to the node number 2.

Also, regarding a certain element, if the shape of the element is deformed from a square to a parallelogram, by obtaining a change amount of an angle formed by adjacent sides and taking into account the change amount to the angle α, the reference direction for the analysis model 1 can be set.

Hence, the angles α are obtained for all elements of the spread-blank-shape 2, and the reference directions are collectively set for all elements in the analysis model 1 corresponding to the respective elements of the spread-blank-shape 2 based on the angles α ((E) described below). Thus, the reference direction can be automatically set in a short time for each element of the analysis model 1.

Then, in (F) described below, sheet thickness information, which is acquired as the sheet thickness information of each element of the analysis model 1 in (B), is input.

In this way, the anisotropy information and the sheet thickness information can be correctly set for the analysis model 1.

The above-described steps can be summarized as follows:
(A) Acquisition of information of original analysis model: the node number 1 and the node number 2 of an element to be calculated are acquired.

(B) Restoration of original analysis model to shape of a blank:
by using analysis of reverse press-forming such as Onestep, a product having a three-dimensional shape is changed to a two-dimensional flat sheet state, and the sheet thickness distribution information for the analysis model is acquired.
(C) Arrangement of the blank:
the blank is moved and rotated with respect to the LC directions, and is arranged.
(D) Calculation of angle in the blank:
the angle formed between the line joining the node number 1 to the node number 2, and the reference direction is calculated by the outer product, with reference to the X coordinates and Y coordinates of the node number 1 and node number 2 acquired in (A).
(E) Setting of angle in the analysis model:
the reference direction is set based on the angle calculated in (D) for the element of the original analysis model.
(F) Setting of sheet thickness in the analysis model:
the sheet thickness acquired in (B) is input to the sheet thickness information of the element of the original analysis model.

Example 1

Operations and advantageous effects by the calculation method of metal sheet anisotropy are described below based on specific examples.

Experiments were executed for respective cases in which the reference-direction-to-C-direction angle θ (metal sheet angle θ) was 0°, 45°, and 90°, and the analysis models 5, in which the anisotropy information and sheet thickness information were set, were acquired. Also, for these analysis models 5, a stiffness analysis was executed, and stiffness values were calculated (Example 1). A 590-Mpa class cold-rolled steel sheet was used as the metal sheet.

Also, actual press-formed panels corresponding to these models were fabricated, the stiffness test (stiffness check experiment) corresponding to the stiffness analysis was executed, and the stiffness value was obtained (Experimental Value 1).

Figure 4:
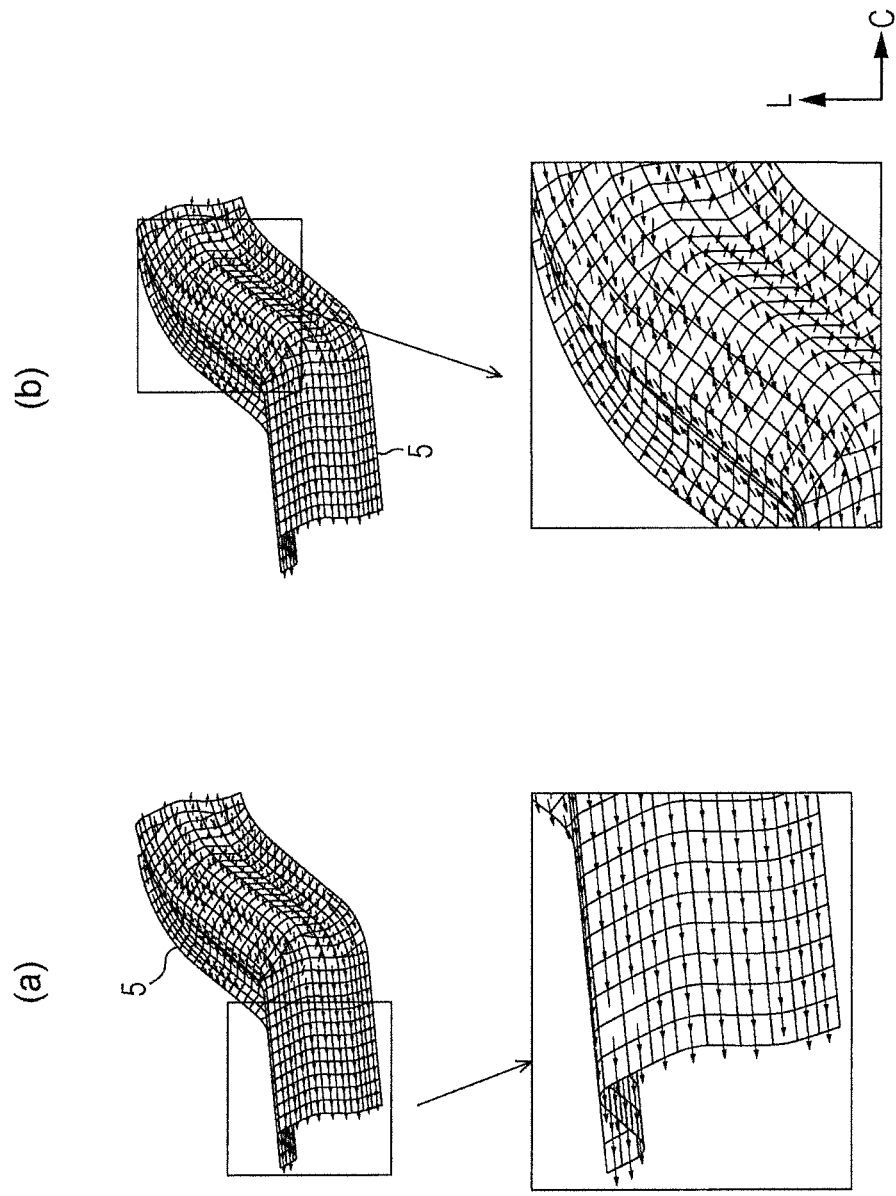
FIGS. 4(a)-(b) provide explanatory views each showing an example of a result of conventional press-forming analysis.

Also, the stiffness analysis was similarly executed on an analysis model 5 after the anisotropy information and the sheet thickness information were set, obtained by a press-forming analyzing method, in which the anisotropy information was manually input and the sheet thickness was constant, for a three-dimensional shape having the same target value as a comparative example (case of θ=0° is illustrated in FIG. 4, but θ=45° and θ=90° are not illustrated), and the stiffness value was calculated (Comparative Example 1).

First, the direction of an arrow indicative of the reference direction in the analysis model 5 is described.

Figure 2:
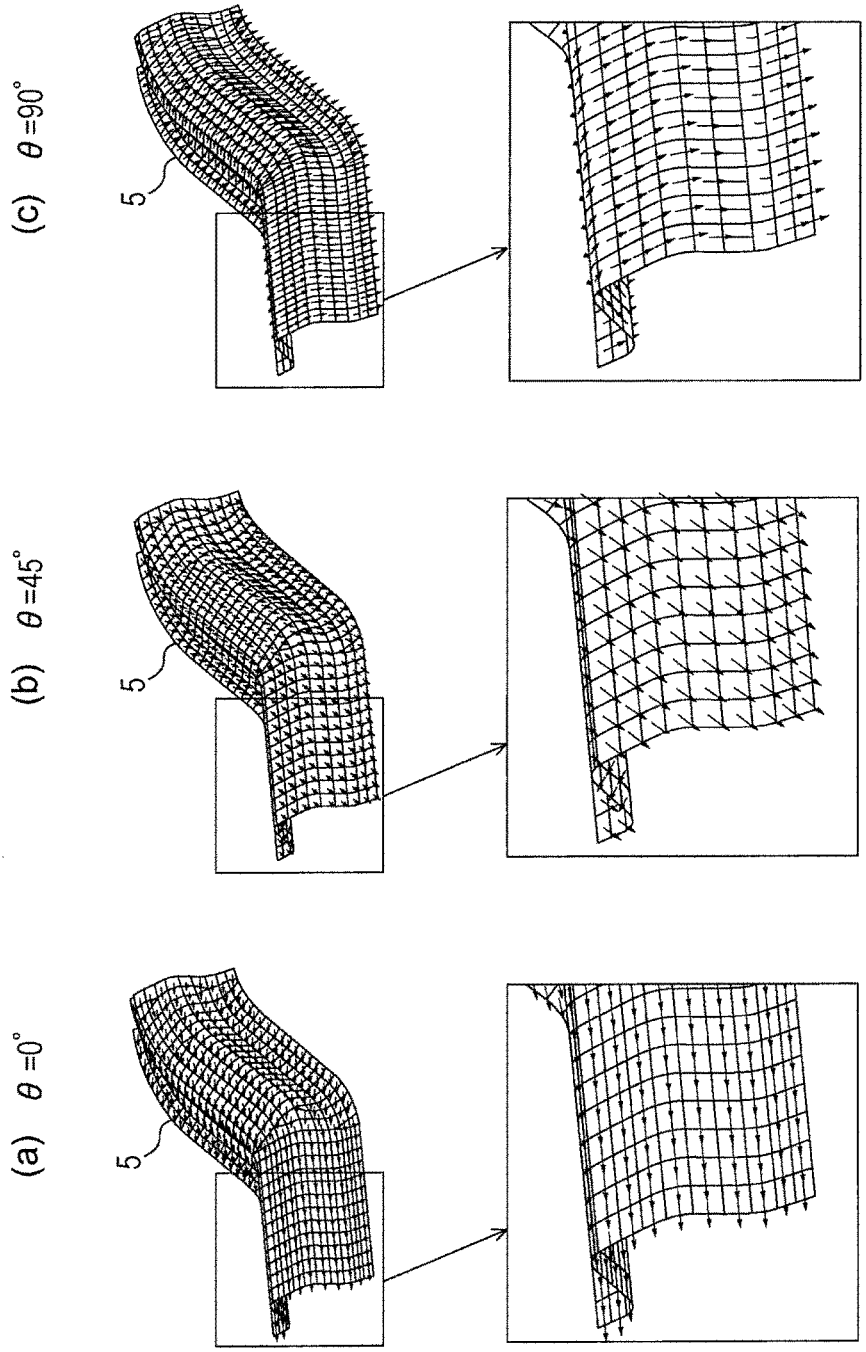
FIGS. 2(a)-(c) provide explanatory views each showing an example of a result of press-forming analysis.
Figure 3:
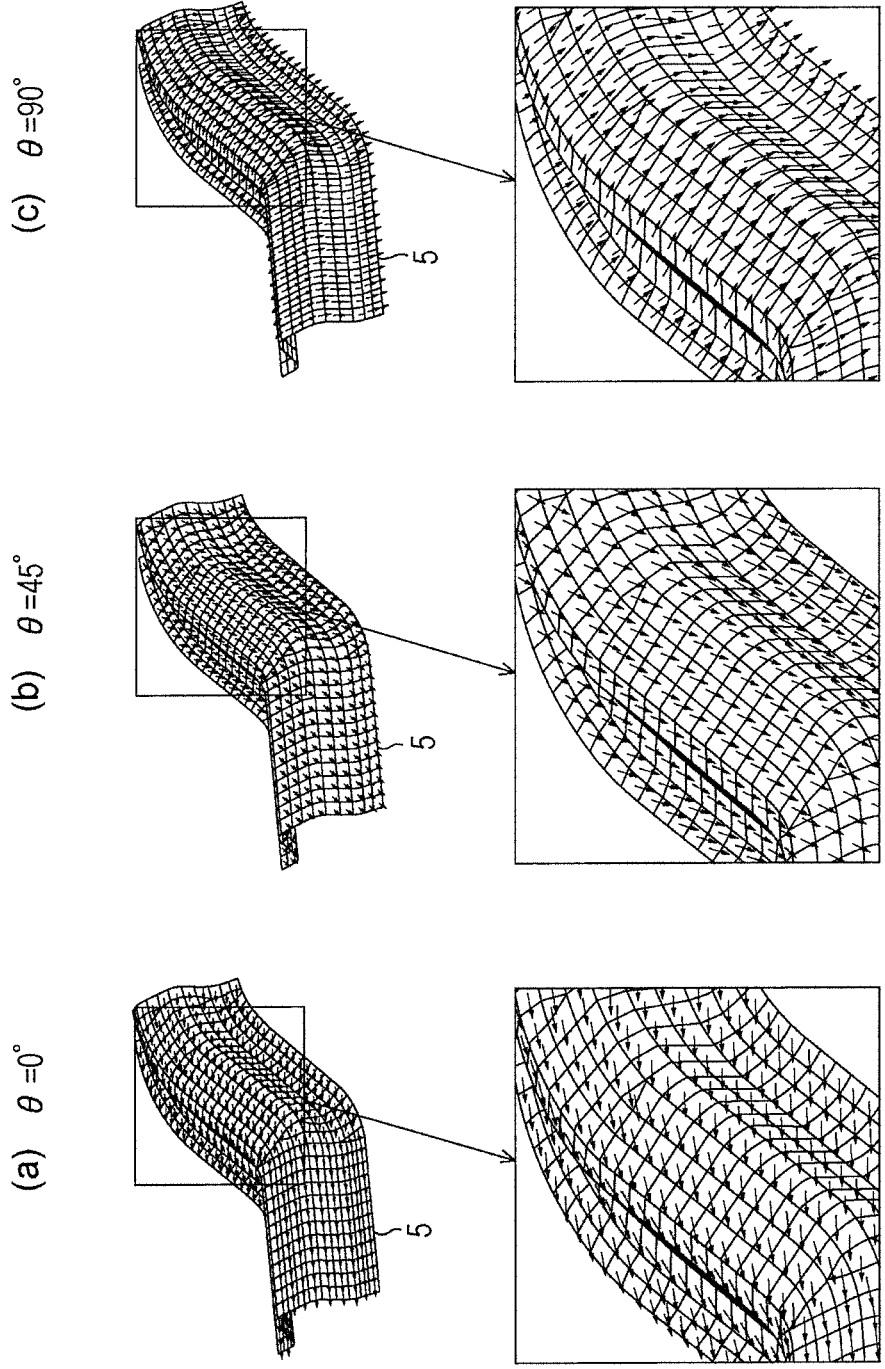
FIGS. 3(a)-(c) provide explanatory views each showing an example of a result of the press-forming analysis.

FIGS. 2 and 3 show the analysis models 5 having the finally calculated shapes obtained through the press-forming analysis. In each of FIGS. 2 and 3, (a) represents the reference-direction-to-C-direction angle θ is 0°, (b) represents the angle θ is 45°, and (c) represents the angle θ is 90°. I found that the arrow indicative of the reference direction is set to match the actual state of every element of the analysis model 5.

FIG. 4 shows the results when the reference-direction-to-C-direction angle θ is 0° according to the comparative example. The reference-direction-to-C-direction angle θ is 0°. However, since the arrow indicative of the reference direction is input based on the guesswork in each element of the three-dimensional shape, the arrows indicate opposite directions between adjacent elements in a straight portion (FIG. 4(a)), and the arrow indicative of the reference direction is input on a large block basis in a curve portion (FIG. 4(b)). Hence, the setting does not match the actual state.

Table 1 shows an example in which the time required for setting the reference direction (arrow input) is compared with that of the comparative example. Referring to Table 1, the required time for setting the reference direction is ⅓ of the conventional time even when the number of elements is as small as 1000, and the required time is 1/27 of the conventional time when the number of elements is as large as 10000. I found that the required time is markedly reduced as compared to the conventional time.

TABLE 1

|  | My Method | Comparative Method |
|---|---|---|
| 1000 meshes | 10 | 30 |
| 10000 meshes | 11 | 270 |

Figure 5:
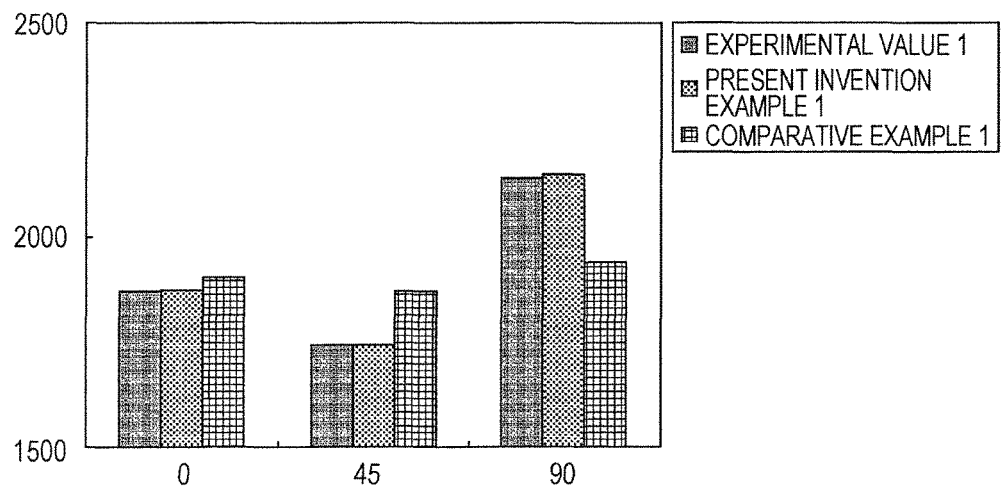
FIG. 5 is a graph showing results of stiffness analysis of Example 1 and Comparative Example 1 compared to experimental values.

Next, the results of the stiffness analysis are described based on Tables 2 and 3, and FIG. 5.

TABLE 2

| | Stiffness value (kN · mm/mm) | | |
|---|---|---|---|
| Metal sheet angle (°) | Experimental Value 1 | Example 1 | Comparative Example 1 |
| 0 | 1872 | 1875 | 1904 |
| 45 | 1743 | 1743 | 1867 |
| 90 | 2135 | 2142 | 1941 |

Table 2 shows the stiffness values (kN·mm/mm) according to Experimental Value 1, Example 1, and Comparative Example 1 corresponding to the respective metal sheet angles (°).

Table 3 shows how the values of Example 1 and Comparative Example 1 deviate from Experimental Value 1 (rate of deviation (%)) based on Table 2.

TABLE 3

| | Rate of deviation from experiment (%) | |
|---|---|---|
| Metal sheet angle (°) | Example 1 | Comparative Example 1 |
| 0 | 0.2 | 1.7 |
| 45 | 0.0 | 7.1 |
| 90 | 0.3 | −9.1 |

As shown in FIG. 5, in Example 1, any reference-direction-to-C-direction angle θ (metal sheet angle) is extremely close to Experimental Value 1. In contrast, in Comparative Example 1, the angle θ is a value relatively close to that of Experimental Value 1 when θ=0°. However, the values are largely different from the experimental values when θ=45° and θ=90°.

As described above, in Example 1, the prediction accuracy of the stiffness value according to the deformation simulation of the stiffness analysis is markedly increased as compared to Comparative Example 1. That is, according to my method, the analysis model 5 with the finally calculated shape in which the anisotropy and sheet thickness are more correctly set could be acquired.

Even when the crashworthiness analysis was executed instead of the stiffness analysis, the analysis was similarly executed, and the similar result could be obtained.

Example 2

Figure 6:
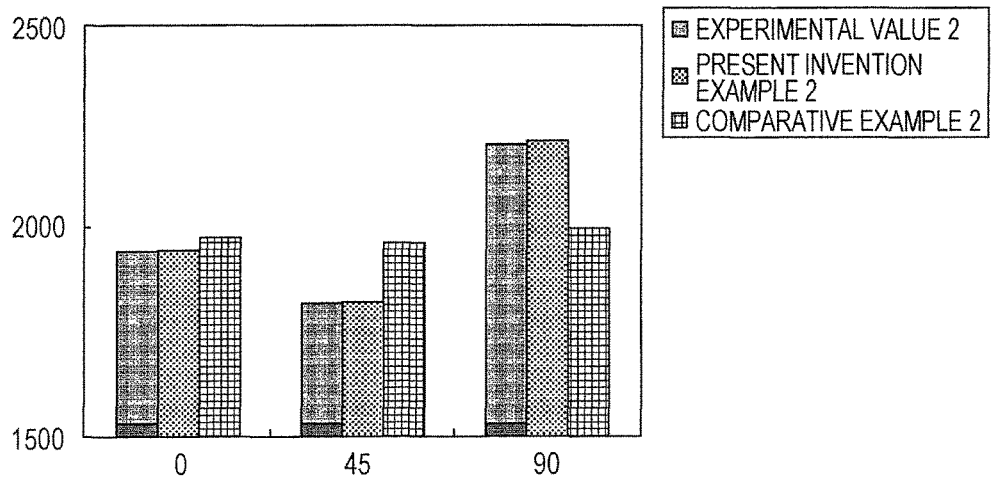
FIG. 6 is a graph showing results of stiffness analysis of Example 2 and Comparative Example 2 compared to experimental values.

Also, to check the difference in advantage caused by the difference in anisotropy of the metal sheet, a 270-Mpa class cold-rolled steel sheet with larger anisotropy than that of the 590-Mpa class cold-rolled steel sheet used in aforementioned Example 1 was used and the similar experiment was executed. The results are shown in Tables 4 and 5, and FIG. 6. The way of looking at the drawing and tables is similar to that of Tables 2 and 3, and FIG. 5.

TABLE 4

| Metal sheet angle (°) | Stiffness value (kN · mm/mm) | | |
| --- | --- | --- | --- |
| | Experimental Value 2 | Example 2 | Comparative Example 2 |
| 0 | 1950 | 1954 | 1983 |
| 45 | 1825 | 1827 | 1971 |
| 90 | 2210 | 2217 | 2005 |

TABLE 5

| Metal sheet angle (°) | Rate of deviation from experiment (%) | |
| --- | --- | --- |
| | Example 2 | Comparative Example 2 |
| 0 | 0.2 | 1.7 |
| 45 | 0.1 | 8.0 |
| 90 | 0.3 | −9.3 |

Referring to Table 5, the deviation between Comparative Example 2 and Experimental Value 2 is substantially the same as that of Example 1 (see Table 4) when the metal sheet angle is 0°. However, the values become large when the metal sheet angle is 45° and 90°. This may be because the deviation more noticeably appeared since the metal sheet with the larger anisotropy was used. In this viewpoint, in Example 2, I found that the value at any metal sheet angle matches Experimental Value 2 well, and the CAE analysis accuracy is markedly increased.

The invention claimed is:

1. A method of designing an automotive body by using a CAE (computer aided engineering) analysis executed by a computer, the CAE analysis comprising,
   setting metal sheet anisotropy information and sheet-thickness-information for an analysis model of a press-formed panel subject to the CAE analysis for designing the automotive body,
   wherein the setting method comprises:
   acquiring a spread blank-shape by spreading the analysis model of the press-formed panel into a spread blank-shape by analysis of reverse press-forming;
   acquiring sheet-thickness-information changed by the analysis of reverse press-forming;
   acquiring a reference-direction based on the spread blank-shape and a panel-taking blank-shape which is taken from a steel sheet having in-plane anisotropy of a mechanical characteristic, the panel-taking blank-shape having a predetermined reference-direction relating to the in-plane anisotropy of a mechanical characteristic of the metal sheet, acquiring the reference-direction of the spread blank-shape;
   setting a reference-direction by calculating an angle formed between the acquired reference-direction of the spread blank-shape and a line joining nodes of each element in the spread blank-shape, adjusting the calculated angle based on a change of a shape of each element in the analysis of reverse press-forming that spreads the analysis model of the press-formed panel into the spread blank-shape, and setting the reference-direction for each element of the analysis model of the press-formed panel based on the adjusted angle; and
   setting the acquired sheet-thickness-information for each element of the analysis model of the press-formed panel.

2. The setting method according to claim 1, wherein the mechanical characteristic is at least one selected from Young's modulus, yield strength, tensile strength, r value, and a stress-strain curve.

3. A method of analyzing stiffness comprising executing a stiffness analysis while the analysis model of the press-formed panel after the reference-direction setting and the sheet-thickness-information setting in the method described in claim 2 serves as an analysis subject.

4. A method of analyzing crashworthiness comprising executing crashworthiness analysis while the analysis model of the press-formed panel after the reference-direction setting and the sheet-thickness-information setting in the method described in claim 2 serves as an analysis subject.

5. A method of analyzing stiffness comprising executing a stiffness analysis while the analysis model of the press-formed panel after the reference-direction setting and the sheet-thickness-information setting in the method described in claim 1 serves as an analysis subject.

6. A method of analyzing crashworthiness comprising executing crashworthiness analysis while the analysis model of the press-formed panel after the reference-direction setting and the sheet-thickness-information setting in the method described in claim 1 serves as an analysis subject.

7. A method of designing an automotive body by using a CAE (computer aided engineering) analysis executed by a computer, the CAE analysis comprising,
   setting metal sheet anisotropy information and sheet-thickness-information for an analysis model of a press-formed panel subject to the CAE analysis for designing the automotive body,
   wherein the setting method comprises:
   spreading the analysis model of the press-formed panel into a spread blank-shape by analysis of reverse press-forming;
   acquiring sheet-thickness-information changed by the analysis of reverse press-forming;
   based on the spread blank-shape and a panel-taking blank-shape which is taken from a steel sheet having in-plane anisotropy of a mechanical characteristic, acquiring a reference-direction of the spread blank-shape;
   calculating an angle formed between the reference-direction of the spread blank-shape and a line joining nodes of each element in the spread blank-shape, adjusting the calculated angle based on a change of a shape of each element in the analysis of reversed press-forming that spreads the analysis model of the press-formed panel into the spread blank-shape, and setting the reference-direction for each element of the analysis model of the press-formed panel based on the adjusted angle; and setting the sheet-thickness-information acquired in the sheet-thickness-information acquiring for each element of the analysis model of the press-formed panel.

* * * * *